United States Patent [19]

Minnick et al.

[11] Patent Number: 5,248,369
[45] Date of Patent: Sep. 28, 1993

[54] BONDING ALUMINUM CLADDING TO RANDOM GLASS MAT REINFORCED POLYPROPYLENE SHEET

[75] Inventors: Michael G. Minnick; Atul Govil, both of Coshocton, Ohio

[73] Assignee: General Electric Company, Worthington, Ohio

[21] Appl. No.: 814,936

[22] Filed: Dec. 30, 1991

Related U.S. Application Data

[62] Division of Ser. No. 531,968, Jun. 1, 1990, Pat. No. 5,092,952.

[51] Int. Cl.$^5$ .............................................. C09J 5/10
[52] U.S. Cl. ................................ 156/306.6; 156/310; 156/322; 156/334; 525/93; 525/96; 525/221
[58] Field of Search ............... 156/306.6, 310, 334, 156/322; 428/297; 525/93, 96, 221

[56] References Cited

U.S. PATENT DOCUMENTS

| | | | |
|---|---|---|---|
| 3,410,928 | 11/1968 | Baum | 525/221 |
| 3,431,157 | 3/1969 | Mack | 156/322 |
| 4,678,836 | 7/1987 | McKinney et al. | 525/221 |
| 4,994,130 | 2/1991 | Ichikawa et al. | 156/322 |
| 5,092,952 | 3/1992 | Minnick et al. | 156/306.6 |

*Primary Examiner*—John J. Gallagher

[57] ABSTRACT

The present invention relates to a method for making a composite article by applying an adhesive composition to one side of each of two foils of metal. The adhesive composition contains an ethylene/acrylic acid copolymer and linear low density polyethylene and thermoplastic styrene/diene block copolymer. A sheet of fiber-reinforced polypropylene is subjected to treating with a coating of a second thermoplastic styrene/diene block copolymer. Finally, the adhesive coated metal foils are mated on under elevated temperature and pressure.

13 Claims, No Drawings

BONDING ALUMINUM CLADDING TO RANDOM GLASS MAT REINFORCED POLYPROPYLENE SHEET

This application is a division of application Ser. No. 07/531,968, filed Jun. 1, 1990, now U.S. Pat. No. 5,092,952.

BACKGROUND OF THE INVENTION

The present invention relates to metal/fiber reinforced polymer composites in general and more particularly to an aluminum clad such composite.

Metal/fiber reinforced polymer composites have been produced in a variety of configurations ranging from decorative laminates to circuit boards to structural parts. Structural composites typically are formed by bonding thin sheets of metal to fiber-reinforced polymer sheets under heat pressing conditions. A variety of structural applications require the metal clad laminate to replace thicker sheets of the metal only. Accordingly, the metal composites must demonstrate performance equivalent to thicker sheet metal including, for example, bending stiffness, flexural strength, tensile strength, impact strength, heat distortion temperature performance, shear strength, peel strength, and the like, obviously depending on the precise use of the product.

For present purposes, over-the-road tractor-trailer or so-called semi-trailer vehicles have trailers that are made from sheet aluminum or other metal stock. Thicknesses of such sheet stock often range from about 4.7 mm to 6.4 mm (about 3/16" to ¼"). Strength and useful life considerations of such aluminum panels, however, must be balanced against the extra weight that is added to the unit with increasing thicknesses of sheet stock. As the trailer weight increases, the mileage that the tractor experiences suffers dramatically. Increased weight also contributes to premature road failure and this is regulated in many jurisdictions. Fabrication of an aluminum composite of reduced weight with equivalent performance to aluminum sheet stock would be an advance in this industry.

BROAD STATEMENT OF THE INVENTION

The present invention is directed to a composite article broadly comprising a core of fiber-reinforced polymer having bonded on either side thereof metal foil, preferably which is aluminum foil. The composite article is made by the steps of applying an adhesive composition to one side of aluminum foil. The adhesive composition comprises a blend of an ethylene/acrylic acid copolymer and one or more of linear low density polyethylene or a first thermoplastic styrene/diene block copolymer. Both sides of a sheet of fiber-reinforced polypropylene are treated under one of two conditions. The first condition comprises coating a second thermoplastic styrene-diene block copolymer which includes an acid or acid anhydride component. The second treatment comprises heat-lofting the fiber-reinforced polypropylene sheet. The adhesive coated aluminum foils are mated with the treated polypropylene sheet under conditions of elevated temperature and pressure for a time sufficient for forming the composite article.

Advantages of the present invention include the fabrication of a composite article that exhibits performance comparable to thicker sheets of aluminum when used in fabricating structural panels, such as for trailers. Another advantage is an adhesive composition that is reliable and consistent in performance when making such composite articles. A further advantage is that the inventive composite article can be made utilizing conventional laminate presses. These and other advantages will become readily apparent to those skilled in the art based upon the disclosure contained herein.

DETAILED DESCRIPTION OF THE INVENTION

The adhesive composition used to bond aluminum or other metal foil to fiber-reinforced polypropylene sheet is formulated from two components. One component comprises an ethylene/acrylic acid copolymer which contains between about 91 and 93.5% ethylene content and has a melt flow index (ASTM D1238) ranging from about 1.5 to 5.0 dg/min. Between about 10 and 50% of the adhesive composition comprises the ethylene/acrylic acid copolymer.

The second component of the adhesive composition can be linear low density polyethylene or a thermoplastic styrene/diene block copolymer. Linear low density polyethylene is reported to have a density of between about 0.9 and 0.925 and an elongation of between about 100% and 800%. Substituting low density polyethylene in the adhesive composition formulation results in a composite that cannot pass a 90° bend test. Thus, the preference for use of linear low density polyethylene with respect to the thermoplastic styrene/diene block copolymer. A variety of such copolymers readily can be envisioned for use in accordance with the precepts of the present invention. Such copolymers include, for example, styrene-butadiene-styrene copolymers (SBS), styrene-isoprene-styrene copolymers (SIS), styrene-ethylene-butylene-styrene copolymers (SEBS), and the like and even mixtures thereof. The molar proportion of styrene to diene in the block thermoplastic copolymer broadly ranges from about 15 to 45% by weight with the balance being the diene portion of the copolymer. The end blocks of the thermoplastic copolymer broadly comprise vinyl aromatic compounds, and preferably a polystyrene block, although homologs of styrene derivatives thereof, such as ring-alkylated styrene (e.g. vinyl toluene) or alpha-alkylated styrene (e.g. alpha-methyl styrene) are alternatively employed to produce the end blocks. Mid-block portion of the molecule is an olefin or mixture of olefins. The olefins are preferably alpha-olefins with from 2 to 5 carbon atoms per molecule, although monomers with more carbon atoms optionally are used together with one or more preferred olefins. The particularly preferred alpha-olefins are ethylene, butadiene, and isoprene. The mid-block portion should be saturated (e.g. by hydrogenation) for achieving the desired degree of metal foil bonding required for composites used as structural trailer panels. The polymer vinyl aromatic end groups broadly have an average molecular weight of between about 8,000 and 45,000, and the mid-block diene component ranges from about 40,000 to 125,000. Processes for producing such block copolymers are well known in the art.

Specific preferred styrene-diene block thermoplastic copolymers commercially available include, for example, Kraton G 1652 (SEBS, 29% styrene), Kraton G 1650 (SEBS, 28% styrene), Kraton 1101 (SBS, 30% styrene), Kraton 1102 (SBS, 28% styrene), Kraton 1107 (SIS, 14% styrene), Kraton FG 1901X (SEBS modified with maleic anhydride, 28% styrene), and Kraton G 2730 (SEBS, 17% styrene), all available from Shell Chemical Company, Houston, Tex. Additional suitable block thermoplastic copolymers include Europrene SOL T 190 (SIS, 15% styrene), available from Enoxy Chimica S.p.A. (Italy); and Stereon 840A (SBS, 43% styrene), available from Firestone Rubber Company, Chicago, Ill.

The adhesive composition is applied to one side of the metal foil preferably to a thickness ranging from about 3 to 8 mils. Besides forming a blend of these ingredients, sheets of the individual components of the adhesive composition can be interposed between the foil and reinforced polypropylene, as amplified on below.

The fiber-reinforced polypropylene sheet preferably utilizes continuous strand glass fiber in a proportion of between about 30 and 40% by weight, though chopped (i.e. non-continuous) fiber can be used. A preferred reinforced polypropylene is Azdel brand glass fiber-reinforced polypropylene (Azdel, Inc.). The polypropylene core used in making the composite article ranges in thickness from between about 3.4 mm and 4 mm (0.135–0.160 inch) preferably is about 3.7 mm (0.145 inch). The coefficient of thermal expansion (CTE) of the reinforced polypropylene sheet is close to the CTE of aluminum. This matching of CTEs is believed to contribute to the elevated temperature performance of the inventive composite.

Use of the adhesive composition to bond the metal foil to the reinforced polypropylene provides a composite article that possesses good lap shear in 90° bend tests, but possesses inadequate peel strength at elevated temperature of about 90° C. For the preferred use of the composite articles as trailer panels, such elevated temperatures are not unusual during the summertime and especially in warmer climates. Thus, such performance considerations dictate that high temperature peel strength be a performance goal of the inventive composite article. Work on the present invention revealed two methods by which high temperature peel strength could be maintained by the composite article. One method comprises coating the sheet of reinforced polypropylene with a styrene/diene block copolymer which includes an acid or anhydride component. Kraton FG 1901X, listed above, is one commercially available material that has been found to function satisfactorily in this regard. It is believed that the modified rubber copolymer acts as an impact modifier to provide elasticity to the fiber-reinforced polypropylene and, thus, inhibits delamination propagation. Hot melt or solvent cast films of about 0.5 to 2 mils in thickness have been found suitable in this regard.

The second method by which high temperature peel strength has been realized comprises heat-lofting of the fiber-reinforced polypropylene sheet. "Heat lofting" for present purposes, comprises applying heat to the surface of the reinforced polypropylene sheet at a temperature sufficient to melt the polypropylene at the surface of the sheet to a sufficient extent to reveal the fibers and permit them to "loft". By increasing the profile of the reinforced polypropylene sheets, peel strength, especially high temperature peel strength, of the composite article is promoted and improved.

The preferred metal foil is aluminum, though other metals (e.g. galvanized steel, stainless steel, etc.) could be used as is necessary, desirable, or convenient in conventional fashion. The preferred aluminum foil broadly has a thickness ranging from between about 0.12 and 1 mm (0.005 and 0.040 inch). The preferred composite article designed to replace 0.187 inches aluminum sheet utilizes 0.032 inch aluminum foil clad on both sides of 0.145 inch continuous glass fiber-reinforced polypropylene sheet.

The treated polypropylene is mated on both sides with the metal foil wherein the adhesive composition readily can be sheets of the ethylene/acrylic acid copolymer and linear low density polyethylene or styrene/diene block copolymer interposed between the metal foil and propylene sheet, or a blend of the ingredients forming the adhesive composition can be applied to the metal foil. The composite article of the present invention has the advantage of being able to be heat pressed in conventional daylight opening presses under relatively moderate conditions including temperatures of between about 130° and 155° C., pressures of between about 14.06 and 28.12 kg/cm$^2$(200–400 psi), and times ranging from about 5 to 10 minutes. Under these conditions, no significant change in the core thickness has been observed. The adhesive composition, however, has been sufficiently heated to provide excellent bond strength between the metal foil and the reinforced polypropylene core.

The following examples show how the present invention has been practiced, but should not be construed as limiting.

EXAMPLES

Example 1

Aluminum foil (0.005 in) was bonded to Azdel brand glass fiber-reinforced polypropylene (0.145 in, 40% glass content, Azdel, Inc.) utilizing several candidate adhesive systems. Press conditions included a temperature of 155° C. and a pressure of 200 psi (14.06 kg/cm$^2$) for about 5–10 minutes. The product composite articles were slit into ⅛ in (3.175 mm) strips and subjected to a 90° C. peel test (IPC 2.4.8 Revision A, March, 1976, The Institute for Interconnecting and Packaging Electronic Circuits, Evanston, Ill.). The following results were recorded:

TABLE 1

| Adhesive Composition Ingredient | Film (in) | Polypropylene Treatment | Peel Strength (lb/in) Room Temp | Peel Strength (lb/in) 90° C. |
|---|---|---|---|---|
| Ethylene/ Acrylic Acid[1] | 0.0015 | None | 0.2 | 0.2 |
| LLDP[2] | 0.003 | | | |
| Ethylene/ Acrylic Acid | 0.0015 | SEBS/MA[3] | 5.5 ± 0.5 | 1.1–1.8 |
| LLDP | 0.003 | 0.001 in. | | |
| SEBS/MA | 0.004 | None | 11.2 | 0.8 |
| Ethylene/ Acrylic Acid | 0.0015 | None | 6.0 | 0.8 |
| SEBS[4] | 3 mil | | | |
| Ethylene/ Acrylic Acid | 0.0015 | Rexene[5] | 1.6 | 0.2 |
| LLDP | 0.003 | 0.001 in. | | |
| Ethylene/ Acrylic Acid | 0.0015 | None | 2.8 | 0.3 |
| XPR 954[6] | 0.004 | | | |
| Ethylene/ Acrylic Acid LLDP | | Heat Lofted | 3–7 | 3–7 |

[1]Primacor RX-178 brand. 93.5% ethylene content. Consolidated Plastics, Chippewa Falls, Wi.
[2]LLDP is linear low density propylene. Plexar 3741 brand of Quantum chemical; extruded by Pierson Industries of Palmer, Ma.
[3]Kraton FG 1091X SEBS (Shell Chemical Co.) cast from VM&P naptha solution.
[4]Kraton G 2730 SEBS (Shell Chemical Co.) extruded fiber.
[5]Rexene APAO RT2730 amorphous polypropylene, cast from VM&P naptha solution.
[6]Proprietary formulated Kraton G cast film, J. P. Stevens, Northampton, Ma.

It will be observed that adequate peel strengths at room temperature could be realized for several of the systems, including Kraton FG 1901 X by itself. Maintaining peel strengths above about 1 lb/in at high temperature, however, could only be maintained in accordance with the treatment of the reinforced polypropylene core as disclosed herein.

Additional samples were made wherein the Azdel core was coated with Kraton FG 1901 X copolymer.

(<0.001 in.). Press conditions were the same as in Example 1. The following composite boards were made:

TABLE 3

| Panel No. | Glass Reinforcement (wt-%) | Al Alloy | Panel per Opening | Panel Thickness (in) | Warp* (in) | Opening Position |
|---|---|---|---|---|---|---|
| 1 | 40 | 3003-H14 | 1 | .207–.213 | ⅛ | Center |
| 2 | 40 | 5052-H32 | 1 | .208–.215 | 7/32 | Center |
| 3 | 40 | 6061-T6 | 1 | .201–.213 | 5/16 | Center |
| 4 | 30 | 3003-H14 | 1 | .210–.219 | ⅛ | Center |
| 5 | 30 | 5052-H32 | 1 | .212–.221 | ⅛ | Center |
| 6 | 30 | 6061-T6 | 1 | .213–.220 | ⅜ | Center |
| 7 | 40 | 3003-H14 | 3 | .204–.214 | 25/32 | Top |
| 8 | 40 | 5052-H32 | 3 | .205–.214 | 1½ | Bottom |
| 9 | 40 | 6061-T6 | 3 | .214–.226 | 1/16 | Center |

*Measured as maximum rise from horizontal surface when boards are laid flat.

Panels 1–3 and 4–6 vary the type of aluminum cladding for two different reinforcement levels of the polypropylene core. Panels 7–9 replicate panels 1–3 except that three per opening in the press were made in order to evaluate variances in position of the panels in the press. Only Panel 9 of this series was tested. The following data was recorded.

TABLE 4

| Test | Panel No. | | | | | | |
|---|---|---|---|---|---|---|---|
| | 1 | 2 | 3 | 4 | 5 | 6 | 9 |
| Dynatup (ft-lb) | 49.5 | 52.2 | 76.2 | 53.9 | 61.3 | 71.5 | 72.9 |
| Flexural Modulus (10⁶ psi) | 31.45 | 32.27 | 41.86 | 50.38 | 33.19 | 28.64 | 32.90 |
| Flexural Yield Strength (kpsi) | 26.77 | 41.21 | 50.47 | 26.25 | 40.60 | 45.73 | 45.44 |
| Double Lap Shear-Max Load (lbs) | 702.3 | 1012.0 | 1024.0 | 712.6 | 722.9 | 920.2 | 944.7 |
| Double Lap Shear-Yield Strength (kpsi) | 49.48 | 71.51 | 72.15 | 50.40 | 51.03 | 64.83 | 66.95 |
| ⅜" Bolt Pullout-Max Load (Lbs) | 1550 | 2175 | 2196 | 1442 | 2801 | 2461 | 2354 |
| ⅜" Bolt Pullout-Yield* Strength (kpsi) | 201 | 282 | 284 | 187 | 363 | 319 | 305 |

*Includes a stress concentration factor of 3.5.

These samples were subject to additional testing and compared to aluminum alloy 5052-H32. The following results were recorded:

TABLE 2

| Test* | Inventive Composite | Aluminum Plate 5052 |
|---|---|---|
| Dynatup | 49.5–72.9 ft-lbs | — |
| Flexural Modulus | 2.9–5.0 × 10⁶ psi | 10 × 10⁶ psi (tensile) |
| 5/16" Bolt Pull Out-Max Load | 1442–2801 lbs | — |
| 5/16" Bolt Pull Out-* Yield Strength | 187–363 kpsi | — |
| Flexural Yield Strength | 26.2–50.5 kpsi (flexural) | 23 × 10³ (tensile) |
| Section Modulus | 23255 | 65392 |
| Double Lap Shear Strength | 49.5–72.2 kpsi | — |
| Weight | 1.8 lb/ft² | 2.6 lb/ft² |

*Includes a stress concentration factor of 3.5.

The above-tabulated results clearly demonstrate that the aluminum composite articles of the present invention possess properties making it suitable for use in trailer construction.

Example 2

Additional reinforced polypropylene panels of two different reinforcement levels (30% and 40%) were bonded with three different grades of aluminum foil (alloys 3003-H14, 5052-H32, and 6061-T6). The adhesive system used was ethylene/acrylic acid copolymer (Primacor RX-178) and LLDP (Plexar 3741) films (0.0015 in. and 0.003 in., respectively) with a Kraton FG 1901X SEBS/MA polypropylene treatment The above-tabulated results do show performance variances dependent upon both aluminum alloy type and glass content of the polypropylene core, as expected. These results also make the composite panels quite suitable in a variety of structural uses, including as trailer panels.

We claim:

1. A method for making composite article which comprises the steps of:
   (a) applying an adhesive composition to one side of each of two foils of metal, said adhesive composition comprising an ethylene/acrylic acid copolymer and linear low density polyethylene and a first thermoplastic styrene/diene block copolymer;
   (b) treating both sides of a sheet of fiber-reinforced polypropylene with a coating of a second thermoplastic styrene/diene block copolymer which includes an acid or acid anhydride component; or and
   (c) mating the adhesive coated side of said metal foils with said treated polypropylene sheet from step (b) under elevated temperature and pressure for forming a composite article.

2. The method of claim 1 wherein said ethylene/acrylic acid copolymer contains between about 91 and 93.5 wt-% ethylene content and has a melt flow index ranging from about 1.5 to 5.0 dg/min.

3. The method of claim 1 wherein said adhesive composition contains between about 10 and 50 wt-% of said ethylene/acrylic acid copolymer.

4. The method of claim 1 wherein said first thermoplastic styrene/diene block copolymer comprises a styrene-ethylene-butadiene-styrene copolymer which contains ethylenic unsaturation.

5. The method of claim 1 wherein said adhesive composition is applied as a sheet thereof.

6. The method of claim 1 wherein said fiber of said fiber-reinforced polypropylene comprises glass.

7. The method of claim 6 wherein said glass content of said fiber-reinforced polypropylene ranges from between about 30% and 40% by weight.

8. The method of claim 1 wherein said fiber-reinforced polypropylene sheet ranges in thickness from between about 0.135 and 0.160 inches.

9. The method of claim 1 wherein said metal foil ranges in thickness from between about 0.12 and 1 mm.

10. The method of claim 1 wherein said foil is aluminum or a steel.

11. The method of claim 10 wherein said foil is an aluminum or aluminum alloy foil.

12. The method of claim 1 wherein said second thermoplastic styrene/diene block copolymer comprises a styrene-ethylene-butadiene-styrene block copolymer modified with maleic anhydride.

13. The method of claim 1 wherein said elevated temperature ranges from between about 130° and 155° C. and said pressure ranges from between about 200 and 400 psi.

* * * * *